Figure 1:
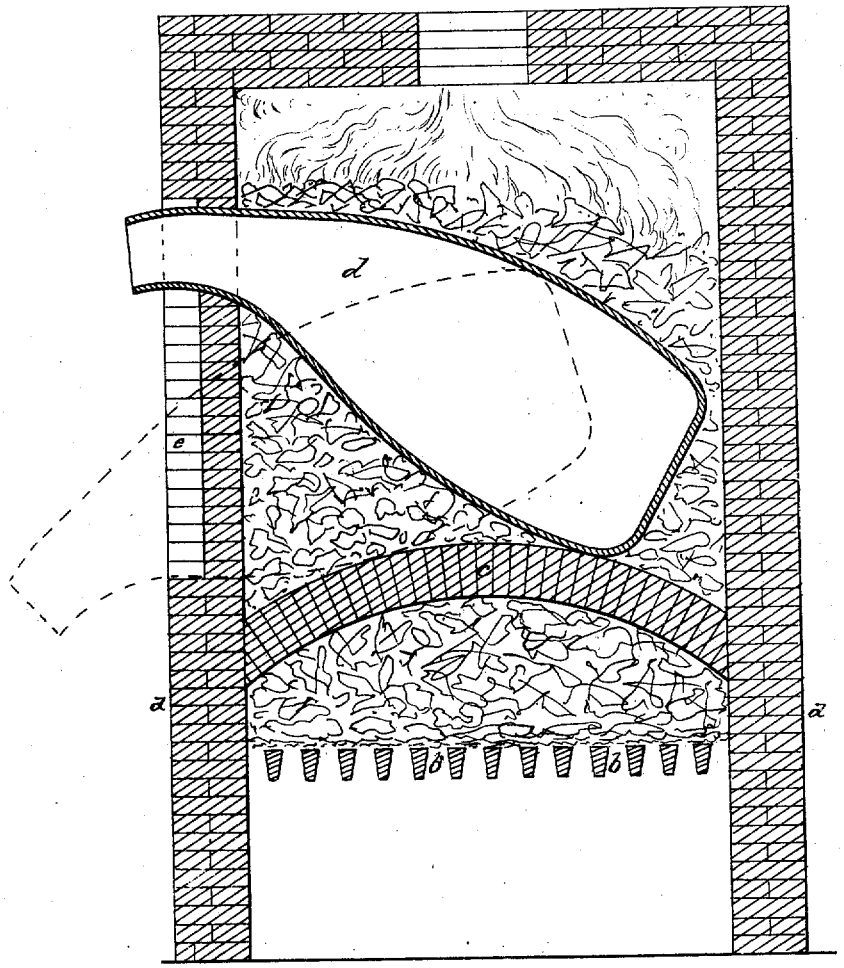

E. BALBACH, Jr.

Retort for Separating Zinc from Gold and Silver Alloys.

No. 8,029. Reissued Jan. 8, 1878.

*Attest*

John Dolley Jr

R. S. Childs Jr

*Inventor*

Edward Balbach Jr by his atty

Geo. H. Harding

N. PETERS, PHOTO-LITHOGRAPHER, WASHINGTON, D. C.

UNITED STATES PATENT OFFICE.

EDWARD BALBACH, JR., OF NEWARK, NEW JERSEY.

IMPROVEMENT IN RETORTS FOR SEPARATING ZINC FROM GOLD AND SILVER ALLOYS.

Specification forming part of Letters Patent No. 64,934, dated May 21, 1867; Reissue No. 5,461, dated June 24, 1873; Reissue No. 8,029, dated January 8, 1878; application filed December 24, 1877.

*To all whom it may concern:*

Be it known that I, EDWARD BALBACH, Jr., of Newark, in the county of Essex and State of New Jersey, have invented, made, and applied to use a certain new and useful Improvement in Retorts for Separating Zinc from Gold and Silver Alloys; and I do hereby declare the following to be a full, clear, and exact description of the said invention, reference being had to the annexed drawing, making part of this specification, wherein I have represented a vertical section of the apparatus employed to effect such separation.

Gold and silver are often found in galena, and it is common to introduce lead for the separation of gold and silver from pyrites, and afterward to employ zinc for concentrating the lead and precious metals. A process for effecting this is set forth in Letters Patent granted to me July 5, 1864.

It has been attempted to remove the zinc from this alloy by placing the alloy in a retort and distilling the zinc off, and collecting it in a receiver or condenser. It was found necessary to use a high degree of heat to accomplish this, and the action of the zinc at such temperature rapidly destroyed the retorts, when made in the usual manner, of the usual material. It was found also inconvenient to remove the residue of alloy from an ordinary fixed retort after the zinc had been distilled off.

I have discovered that by the use of a retort made of plumbago the injurious action of the zinc will be arrested, and the zinc can be distilled from numerous charges successively without the retorts being destroyed.

I have also discovered that by making the retort movable, so as to tilt after the operation of distilling off the zinc is completed, the fused residue can be poured off.

In the drawing, *a a* are the walls of a furnace of any desired size. *b b* are the grate-bars. *c* is a bridge or bearer of fire-brick, narrow, so that the coal may be packed.

The retort *d* is made of plumbago or black-lead, with a neck at one end, and rests upon the said bearer *c*.

Plumbago or black-lead has been heretofore employed to manufacture what are well known as "black-lead" or "plumbago" crucibles in the arts, the process of making which is also well known. I propose to manufacture my retorts out of the same composition and in the same manner, and shape them as shown in the drawing.

The front of the furnace is provided with an opening at *e*, through which the neck of the retort *d* projects, and this opening is sufficiently long to allow the retort to be turned down from the one to the other position shown, and when the retort is in use this opening is to be filled by a block of fire-brick, or by separate fire-bricks introduced beneath the neck of the retort *d*, which also hold the same up during the distillation of the zinc, which is driven off from the mass of metal introduced within the retort. The zinc is to be received and condensed in any suitable chamber connected to the neck of the retort, and when the zinc has been distilled off, the space *e* is to be opened and the retort turned down to pour out the alloy of gold, silver, and lead in the concentrated form in which this process leaves the same.

The fuel is to be supplied through a suitable opening over the retort, and the products of combustion may be taken from the same place to a chimney.

Two or more of these retorts may be inserted side by side in the same fire, using one condensing-chamber.

What I claim, and desire to secure by Letters Patent, is—

1. A black-lead retort suitable for receiving gold, silver, lead, and zinc alloys, or of an alloy composed of any, all, or either of the said metals, and distilling off the zinc, the remaining alloy being afterward removed.

2. A movable retort formed with a neck, and introduced within a furnace, substantially as set forth, so as to be suitable for receiving gold, silver, lead, and zinc alloys, and distilling off the zinc, the remaining alloy being poured out by inclining the retort, as set forth.

EDWARD BALBACH, JR.

Witnesses:
ROBT. F. HENNINGER,
HENRY F. GÖKEN.